United States Patent
Iyanagi

(10) Patent No.: US 10,328,967 B2
(45) Date of Patent: Jun. 25, 2019

(54) COLUMN BLIND DEVICE

(71) Applicant: HONDA MOTOR CO., LTD., Tokyo (JP)

(72) Inventor: Kenji Iyanagi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/451,671

(22) Filed: Mar. 7, 2017

(65) Prior Publication Data

US 2017/0253263 A1 Sep. 7, 2017

(30) Foreign Application Priority Data

Mar. 7, 2016 (JP) .................................. 2016-043113

(51) Int. Cl.
*B62D 1/187* (2006.01)

(52) U.S. Cl.
CPC .................... *B62D 1/187* (2013.01)

(58) Field of Classification Search
CPC ....................................................... B62D 1/187
See application file for complete search history.

(56) References Cited

U.S. PATENT DOCUMENTS

| 7,077,431 | B2 | 7/2006 | Gayer et al. |
| 7,661,710 | B2 * | 2/2010 | Ikeda et al. |
| 9,566,928 | B2 * | 2/2017 | Forth et al. |
| 2004/0129098 | A1 | 7/2004 | Gayer et al. |
| 2009/0033083 | A1 * | 2/2009 | Kobayashi et al. |
| 2013/0106129 | A1 * | 5/2013 | Brant et al. |

FOREIGN PATENT DOCUMENTS

| JP | 6470263 A | 3/1989 |
| JP | 6-50954 U | 7/1994 |
| JP | 2005-7965 A | 1/2005 |
| JP | 2008-68807 A | 3/2008 |
| JP | 2009-35077 A | 2/2009 |
| JP | 2010-247737 A | 11/2010 |
| JP | 2012-504528 A | 2/2012 |

OTHER PUBLICATIONS

Office Action dated Jan. 23, 2018, issued in counterpart Japanese Application No. 2016-043113, with English translation (28 pages).
Office Action dated Sep. 5, 2017, issued in counterpart Japanese Application No. 2016-043113, with English machine translation. (19 pages).
Chinese Office Action dated Apr. 3, 2019, issued in counterpart Chinese Patent Application No. 201710120576.5 with English translation. (13 pages).

* cited by examiner

*Primary Examiner* — Darlene P Condra
(74) *Attorney, Agent, or Firm* — Westerman, Hattori, Daniels & Adrian, LLP

(57) ABSTRACT

A column blind device includes a blind which covers a gap between a lower instrument-panel support portion and a column cover, an instrument-panel support to which one end of the blind is fastened, and a cover support to which the another end of the blind is fastened. Furthermore, in a vehicle front-rear direction, the instrument-panel support is provided at a position which is an intermediate position of the cover support between a foremost position and a rearmost position of the cover support.

6 Claims, 12 Drawing Sheets

COLUMN BLIND DEVICE

CROSS REFERENCES TO RELATED APPLICATIONS

The present application claims priority under 35 U.S.C. § 119 to Japanese Patent Application No. 2016-043113, filed Mar. 7, 2016, entitled "Column Blind Device." The contents of this application are incorporated herein by reference in their entirety.

BACKGROUND

1. Field

The present disclosure relates to a column blind device that covers a gap between an instrument panel and a cover of a steering column.

2. Description of the Related Art

A tilting-type or a telescopic-type steering column is adopted for recent automobiles to allow the angle and position of a steering wheel to be adjusted for a build of a driver. With such automobiles, when the steering column is moved in the up-down direction or the vehicle front-rear direction, the size of a gap between an instrument panel and a column cover that covers the steering column increases or decreases.

In order to cover the gap between the instrument panel and the column cover, column blind devices are used. In some column blind devices, a flexible blind is supported by an attachment for the instrument panel (referred to as an "instrument-panel attachment" hereafter) and an attachment for the column cover (referred to as a "column-cover attachment" hereafter) and disposed between the instrument-panel attachment and the column-cover attachment. The blind is disposed over the gap between the instrument panel and the column cover, that is, the gap is covered with the blind (for example, see Japanese Unexamined Patent Application Publication No. 2010-247737).

Meanwhile, a space between the instrument-panel attachment and the column-cover attachment is small. For this reason, it is difficult to make the blind exactly follow movements of the steering column in the up-down direction and the vehicle front-rear direction, and accordingly, bending creases and slack creases may occur in the blind. It is particularly difficult to make the blind exactly follow the movements of left and right corner projections on an upper surface of the column cover in the up-down direction and the vehicle front-rear direction. Accordingly, bending creases and slack creases are likely to occur at the left and right corner projections in the blind.

Furthermore, in a column blind device according to Japanese Unexamined Patent Application Publication No. 2010-247737, a front wall is formed in the instrument-panel attachment. Accordingly, when the steering column is moved toward the front of a vehicle body, advancement of part of the blind on a column-cover upper surface side is suppressed by the front wall. However, advancement of parts of the blind on column-cover left and right vertical wall sides toward the front of the vehicle body cannot be suppressed by the front wall. Thus, the amount of advancement may differ between the part of the blind on the column blind device upper surface side and the parts of the blind on the column-cover left and right vertical wall sides, and accordingly, bending creases and slack creases may occur in the blind.

SUMMARY

The present application provides a column blind device with which the occurrences of bending creases and slack creases in a flexible blind can be suppressed.

According to an aspect of the present application, a column blind device is provided in a vehicle in which a steering column is adjustable relative to an instrument panel in a vehicle front-rear direction and an up-down direction. The column blind device covers a gap between the instrument panel and a column cover covering the steering column. The column blind device includes a flexible blind disposed in the gap, an instrument-panel-side support which is provided in the instrument panel and to which one end of the blind is fastened, and a column-cover-side support which is provided in the column cover and to which another end of the blind is fastened. Here, the steering column is configured to move at least between its foremost position and its rearmost position in the vehicle front-rear direction, in accordance with which the column-cover-side support moves between its foremost position and its rearmost position. In the vehicle front-rear direction, a position where the instrument-panel-side support is set is an intermediate position defined with respect to the movable range of the column-cover-side support, i.e., the intermediate position between the foremost position and the rearmost position of the column-cover-side support.

As described above, in the vehicle front-rear direction, the position where the instrument-panel-side support is provided is the intermediate position of the column-cover-side support between the foremost position and the rearmost position of the column-cover-side support. Here, when the column-cover-side support is disposed at the intermediate position, the length of the line segment connecting the column-cover-side support and the instrument-panel-side support is the length of the blind. Accordingly, when the column-cover-side support is disposed at the intermediate position, the occurrences of bends and slackness in the flexible blind can be suppressed.

Furthermore, the instrument-panel-side support is disposed at the intermediate position of the column-cover-side support. Thus, when the column-cover-side support is disposed at either the foremost position or the rearmost position, the extension/contraction ratio of the blind can be made substantially equal. Furthermore, the blind is set so that an endurable extension/contraction allowable range of the blind is not exceeded. This can suppress the occurrences of bending creases and slack creases in the flexible blind.

Furthermore, the one end of the blind is fastened to the instrument-panel-side support and the other end of the blind is fastened to the column-cover-side support. Thus, the gap between the instrument-panel-side support and the column-cover-side support can be preferably covered so that the gap is covered by the blind.

Preferably, the blind includes an upper surface portion disposed on an upper side of the column cover, and a length of the upper surface portion is a distance between the instrument-panel-side support and the column-cover-side support when the column-cover-side support is disposed at a position which is a lowermost position in the up-down direction and the intermediate position.

Here, when the column-cover-side support is disposed at the position which is the lowermost position and either the foremost position or the rearmost position, the length of the blind is set so that the extension rate of the blind falls within a range of the extension rate that is found to be appropriate in temperature/humidity testing. In other words, the blind is set so that the endurable extension/contraction allowable range of the blind is not exceeded. Thus, when the column-cover-side support is disposed between the foremost position and the rearmost position, the blind can be maintained to have a linear shape due to an extension/contraction effect of the blind. This can suppress the occurrences of bending creases and slack creases in the flexible blind.

Preferably, the instrument-panel-side support includes a side portion disposed at a side of the column cover, and the side portion is formed so as to be similar to a locus of the column-cover-side support in the up-down direction.

One end of a side surface portion of the blind is fastened to the side portion of the instrument-panel-side support. Thus, the one end of the side surface portion of the blind is formed so as to be similar to a locus of the column-cover-side support in the up-down direction. This allows the dimension of the side surface portion of the blind to be reduced to a minimum necessary length. Accordingly, when the column cover has been adjusted in the up-down direction and the vehicle front-rear direction, the occurrences of bending creases and slack creases in the side surface portion of the blind can be suppressed.

Preferably, a level of a lower end of the side portion is identical to a level of a lower end of a side portion of the column-cover-side support when the column-cover-side support is disposed at an intermediate position in the up-down direction.

The one end of the side surface portion of the blind is fastened to the side portion of the instrument-panel-side support. Thus, the level of the lower end of the side surface portion is the same as the level of the lower end of the side portion of the column-cover-side support when the column-cover-side support is disposed at the intermediate position in the up-down direction.

Accordingly, the extension/contraction ratio of the side surface portion for adjustment in the up-down direction when the column-cover-side support is disposed at the foremost position can be substantially equal to the extension/contraction ratio of the side surface portion for adjustment in the up-down direction when the column-cover-side support is disposed at the rearmost position. Furthermore, the blind can be set so that the endurable extension/contraction allowable range of the blind is not exceeded. Accordingly, when the column cover has been adjusted in the up-down direction and the vehicle front-rear direction, the occurrences of bending creases and slack creases in the side surface portion of the blind can be suppressed.

Preferably, the other end of the blind extends from a front side to a rear side of the column-cover-side support and is fastened to the column-cover-side support.

Thus, the other end of the blind can be formed into a substantially I shape in section. That is, it is not necessary to bend the other end of the blind into a substantially U shape. This allows the material required for forming the blind to be reduced, and accordingly, the weight and the cost of the blind can be reduced.

DESCRIPTION OF THE PREFERRED EMBODIMENTS

An embodiment of the present application will be described below with reference to the accompanying drawings. Herein, "front (Fr)", "rear (Rr)", "left (L)", and "right (R)" directions are those seen from a driver.

Embodiment

Figure 1:
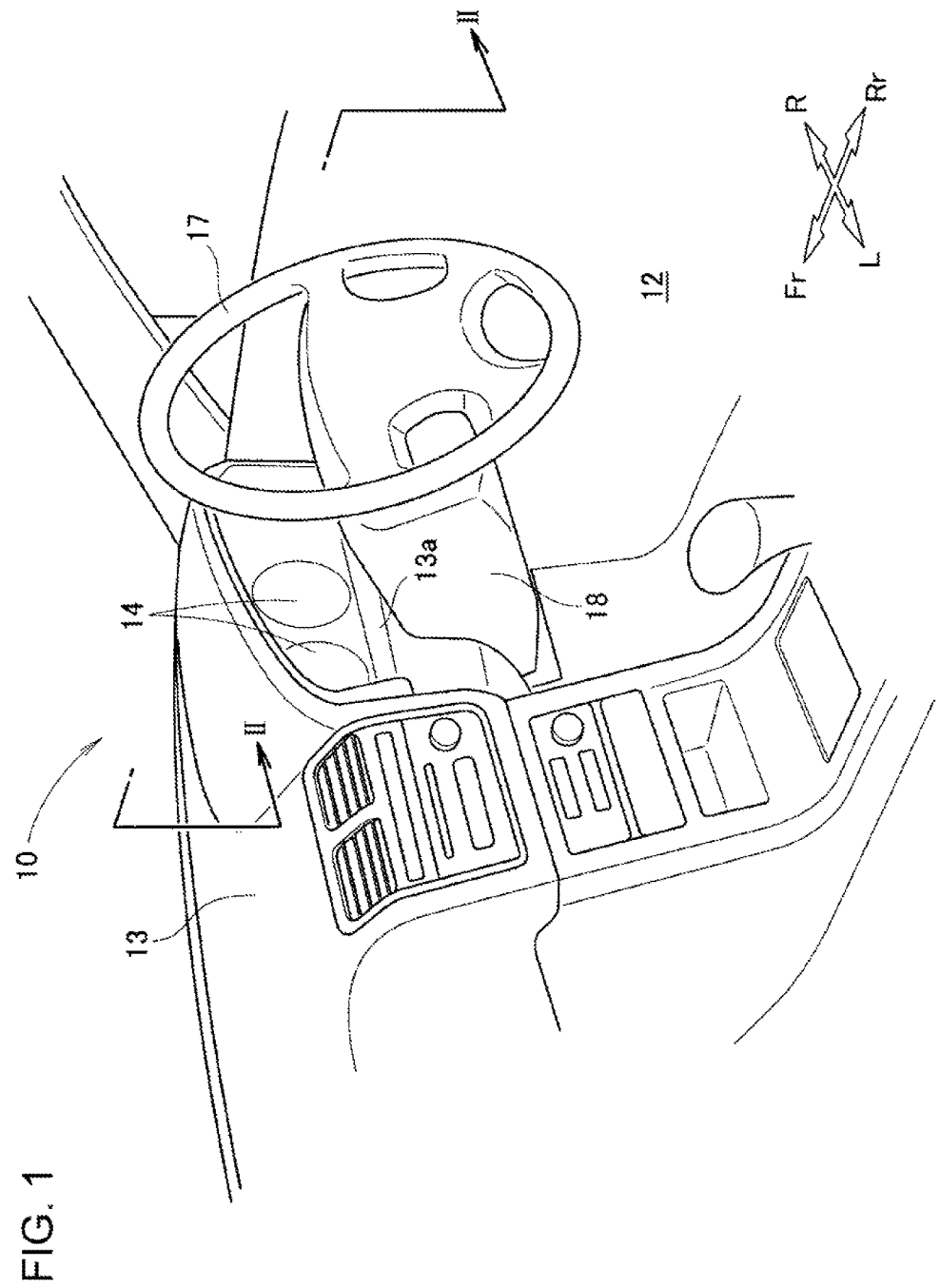
FIG. 1 is a perspective view of a vehicle that includes a column blind device according to the present application.
Figure 2:
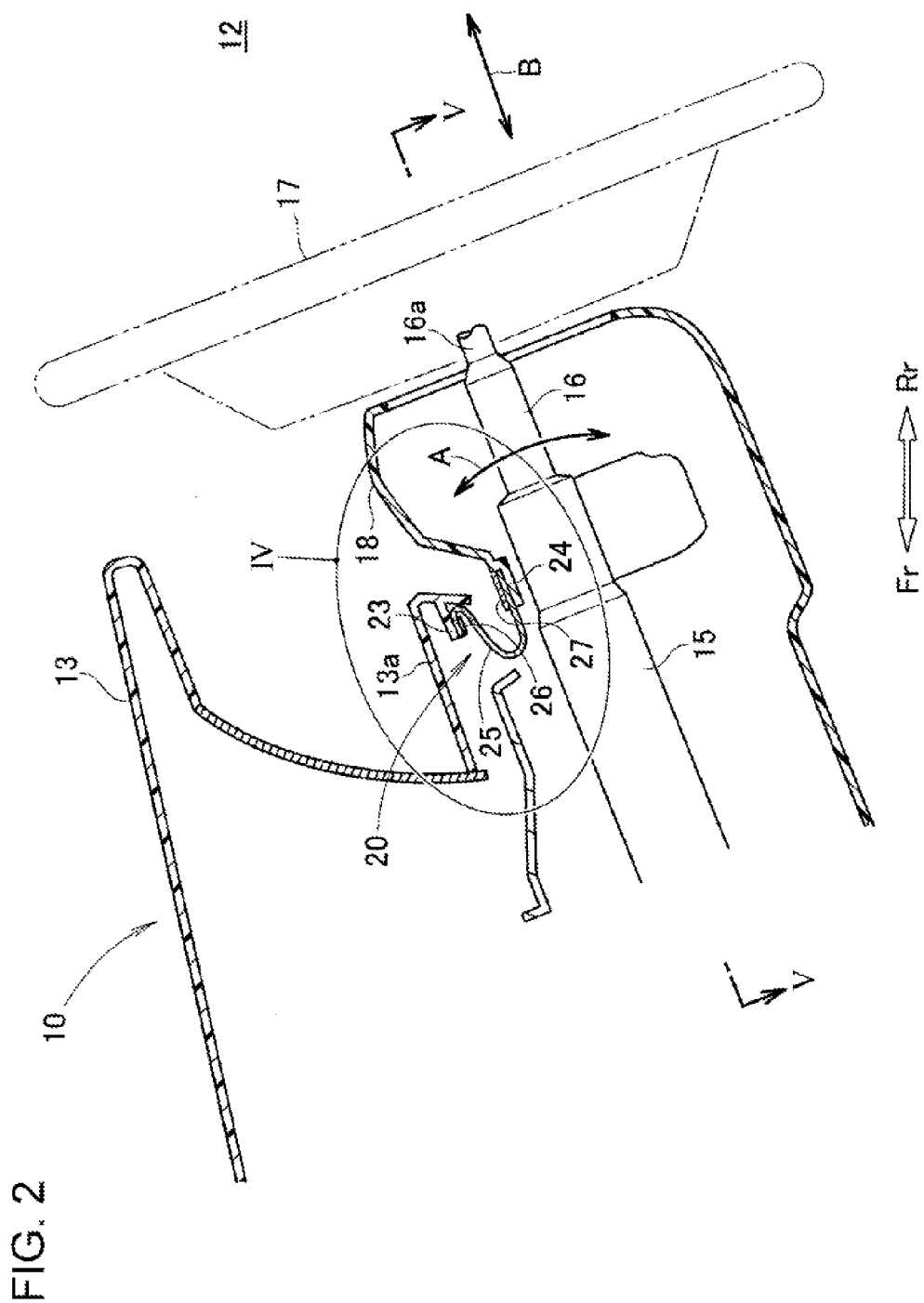
FIG. 2 is a sectional view taken along line II-II of FIG. 1.

A column blind device 20 according to an embodiment is described. As illustrated in FIGS. 1 and 2, a vehicle 10 includes an instrument panel 13, instruments 14, a steering column 15, and a steering shaft 16. The instrument panel 13 is provided at a front portion of a vehicle cabin 12. The instruments 14 are provided in the instrument panel 13. The steering column 15 is supported below the instruments 14. The steering shaft 16 is rotatably supported by the steering column 15.

The vehicle 10 includes a steering wheel 17, a column cover 18, and the column blind device 20. The steering wheel 17 is attached to a rear end portion 16a of the steering shaft 16. The column cover 18 is attached to the steering column 15. The column blind device 20 is provided between the column cover 18 and the instrument panel 13.

The steering column 15 and the steering shaft 16 are covered by the column cover 18. The column cover 18 is disposed below an instrument-panel lower portion 13a of the instrument panel 13. The instrument-panel lower portion 13a is located below the instruments 14. A tilt mechanism (not illustrated) that swings the steering column 15 upward and downward and a telescopic mechanism (not illustrated) that moves the steering column 15 in the axial direction are provided below the instrument panel 13. The steering column 15 is moved in the up-down direction (that is, arrow A direction) relative to the instrument panel 13 (specifically, the instrument-panel lower portion 13a) by operating the tilt mechanism. Thus, the level of the steering wheel 17 is adjusted.

Also, the steering column 15 is moved in the vehicle front-rear direction (that is, arrow B direction) relative to the instrument-panel lower portion 13a by operating the telescopic mechanism. Thus, the position of the steering wheel 17 in the vehicle front-rear direction is adjusted. Here, the column cover 18 is moved in the up-down direction (arrow A direction) and the vehicle front-rear direction (arrow B direction) together with the steering column 15.

Figure 3:
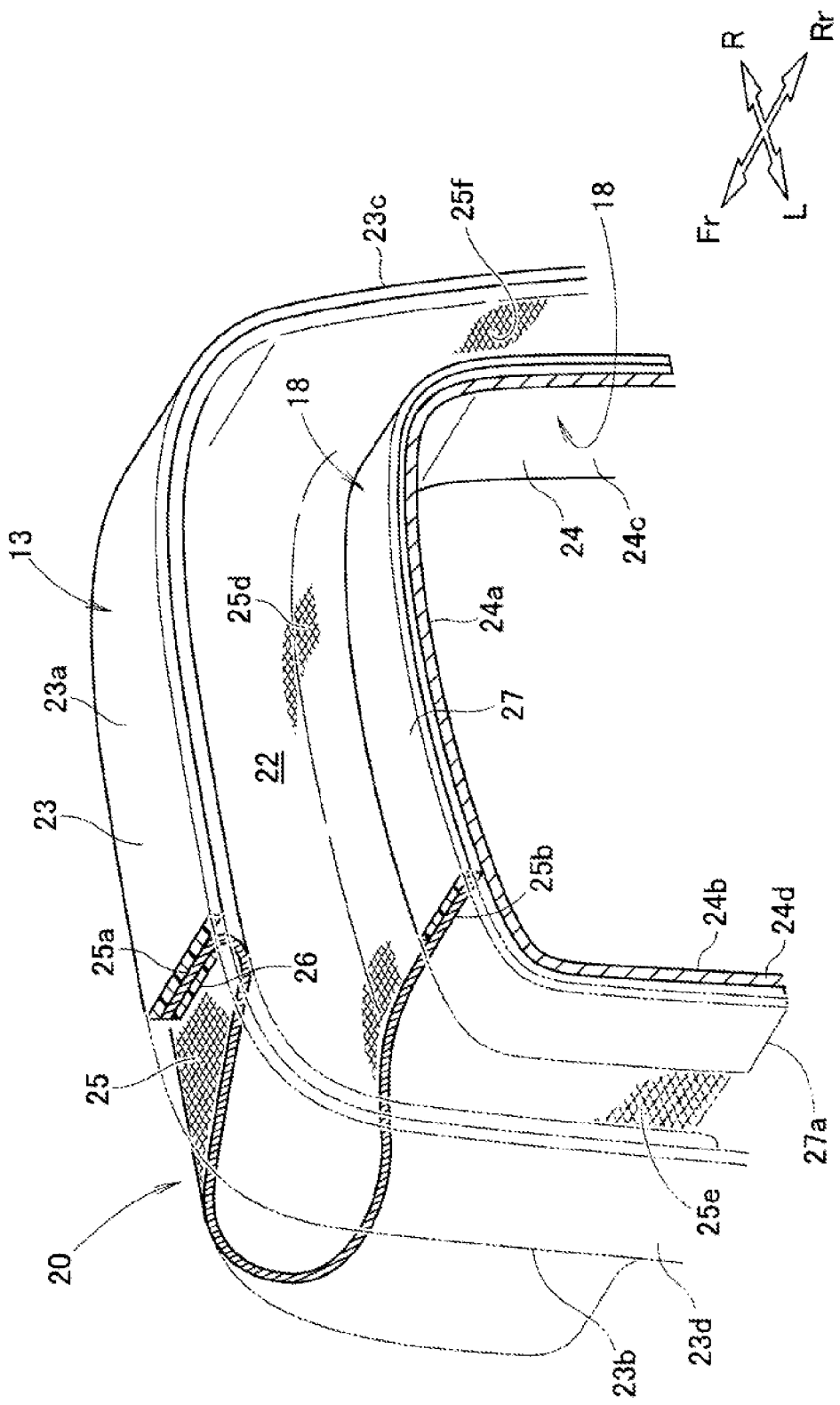
FIG. 3 is a perspective view of the column blind device according to the present application.

As illustrated in FIG. 3, the column blind device 20 covers a gap 22 between the instrument panel 13 and the column cover 18. Specifically, the column blind device 20 includes an instrument-panel support (instrument-panel-side support) 23, a cover support (column-cover-side support) 24, a blind 25, an instrument-panel attachment plate 26, and a cover attachment plate 27. The instrument-panel support 23 is provided in the instrument-panel lower portion 13*a*. The cover support 24 is provided in the column cover 18. The blind 25 is supported by the instrument-panel support 23 and the cover support 24. One end 25*a* of the blind 25 is fastened to the instrument-panel support 23 with the instrument-panel attachment plate 26. Another end 25*b* of the blind 25 is fastened to the cover support 24 using the cover attachment plate 27.

The instrument-panel support 23 includes an upper instrument-panel support portion 23*a*, a left instrument-panel support portion (a side portion of the instrument-panel-side support) 23*b*, and a right instrument-panel support portion (a side portion of the instrument-panel-side support) 23*c*. The upper instrument-panel support portion 23*a* substantially horizontally extends. The left instrument-panel support portion 23*b* extends downward from a left end of the upper instrument-panel support portion 23*a*. The right instrument-panel support portion 23*c* extends downward from a right end of the upper instrument-panel support portion 23*a*.

The left instrument-panel support portion 23*b* is disposed to the left of the column cover 18. The right instrument-panel support portion 23*c* is disposed to the right of the column cover 18. The shape of the right instrument-panel support portion 23*c* is substantially the mirror image of the shape of the left instrument-panel support portion 23*b*. Accordingly, detailed description of the right instrument-panel support portion 23*c* is omitted hereafter.

The cover support 24 includes an upper cover support portion 24*a*, a left cover support portion (a side portion of the column-cover-side support) 24*b*, and a right cover support portion (a side portion of the column-cover-side support) 24*c*. The upper cover support portion 24*a* is disposed below the upper instrument-panel support portion 23*a*. The left cover support portion 24*b* extends downward from a left end of the upper cover support portion 24*a*. The right cover support portion 24*c* extends downward from a right end of the upper cover support portion 24*a*. The shape of the right cover support portion 24*c* is substantially the mirror image of the shape of the left cover support portion 24*b*. Accordingly, detailed description of the right cover support portion 24*c* is omitted hereafter.

The blind 25 includes an upper surface portion 25*d*, a left side surface portion (side surface portion) 25*e*, and a right side surface portion (side surface portion) 25*f*. The upper surface portion 25*d* is disposed on the upper side of the column cover 18. The left side surface portion 25*e* is disposed on the left side of the column cover 18. The right side surface portion 25*f* is disposed on the right side of the column cover 18. The shape of the right side surface portion 25*f* is substantially the mirror image of the shape of the left side surface portion 25*e*. Accordingly, detailed description of the right side surface portion 25*f* is omitted hereafter.

The blind 25 is formed of a knitted fabric (that is, raw material) having flexibility and an extension/contraction property. Specifically, as the raw material of the blind 25, a flat knit having an appropriate extension/contraction property has been developed and is in use by determining a range of time within which the flat knit is not affected due to deterioration thereof over years.

Furthermore, the number of bends in the blind 25 is reduced, so that the knit can be shaped into (can followed the shape of) the blind 25. Specifically, the other end 25*b* of the blind 25 extends from the front to the rear of the cover support 24 so as to have a substantially I shape in section. Accordingly, it is not necessary to bend the other end 25*b* of the blind 25 into a substantially U shape. In contrast, the one end 25*a* and a portion near the one end 25*a* of the blind 25 are bent into a substantially U shape. That is, the blind 25 has a substantially Z shape in section (see also FIG. 4). The other end 25*b* of the blind 25 having the substantially I shape in section is in contact with and fastened to the cover support 24.

Furthermore, since the blind 25 is formed to have the substantially Z shape in section, the design versatility of an attachment position of an upper portion (that is, the one end 25*a*) of the blind 25 in the vehicle front-rear direction can be ensured without impairment of the function of the blind 25, that is, the function of hiding the instrument-panel attachment plate 26 and the gap 22. In addition, the blind 25 is formed of a knit raw material. Thus, suitability of the blind 25 for volume production is increased and the production cost is further reduced compared to a thin cloth-shaped blind formed of a rubber raw material having extension/contraction performance.

Furthermore, uniformity in color, gloss, and texture of the raw material of the blind 25 can be easily obtained compared to the case where the blind 25 is formed of the rubber raw material having extension/contraction performance. This can improve the appearance (design) of the blind 25.

Figure 4:
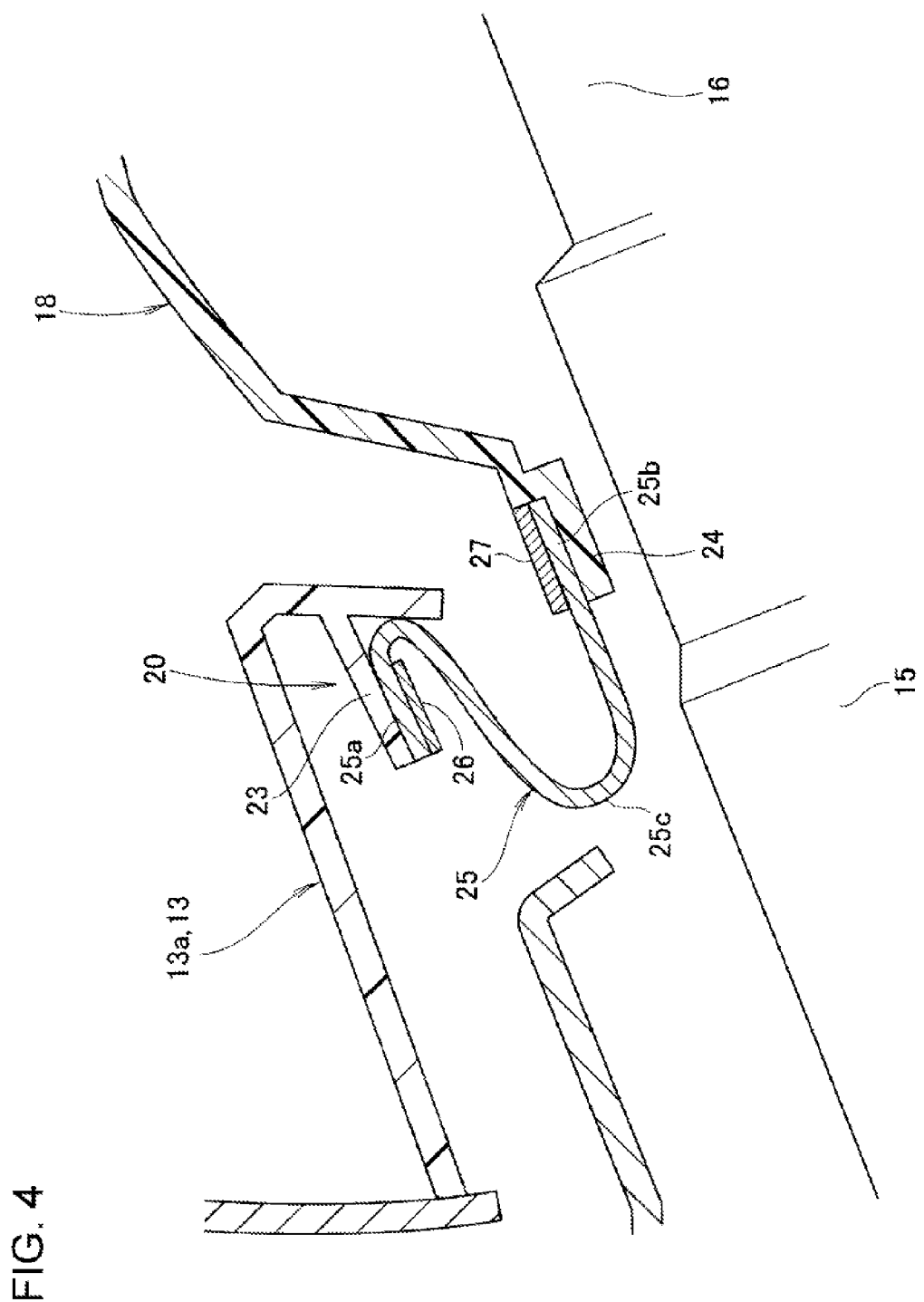
FIG. 4 is an enlarged view of part IV of FIG. 2.
Figure 5:
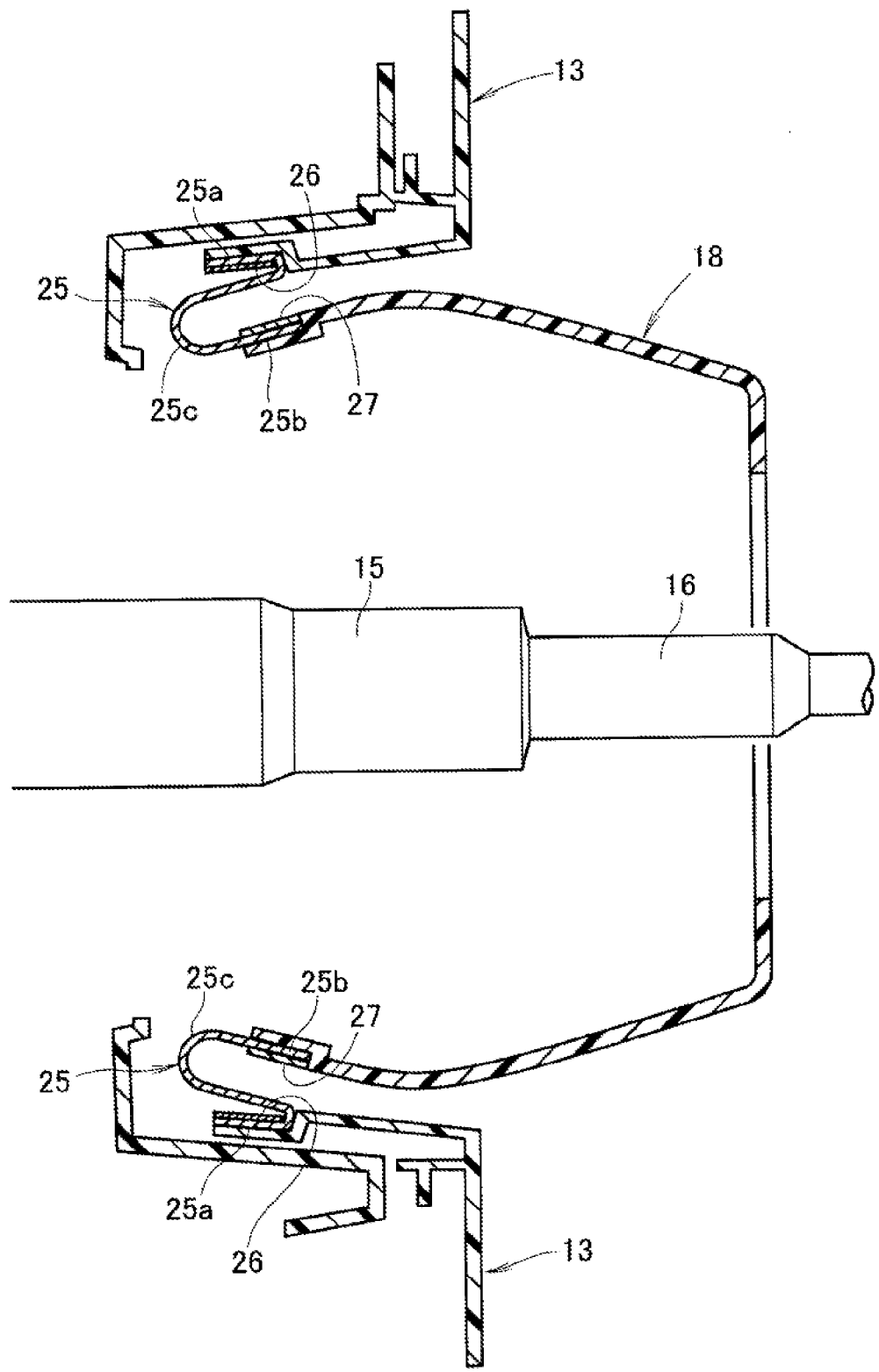
FIG. 5 is a sectional view taken along line V-V of FIG. 2.

As illustrated in FIGS. 4 and 5, the one end 25*a* of the blind 25 is secured to the instrument-panel support 23 in a state in which the one end 25*a* is interposed between the instrument-panel support 23 and the instrument-panel attachment plate 26. Furthermore, the other end 25*b* of the blind 25 is fused to the cover attachment plate 27 to which a clip is attached. The other end 25*b* of the blind 25 is attached to the cover support 24 together with the cover attachment plate 27 using this clip. In this state, an intermediate portion 25*c* of the blind 25 is disposed in the gap 22 between the instrument panel 13 and the column cover 18, thereby the gap 22 is covered with the intermediate portion 25*c* of the blind 25.

Figure 6:
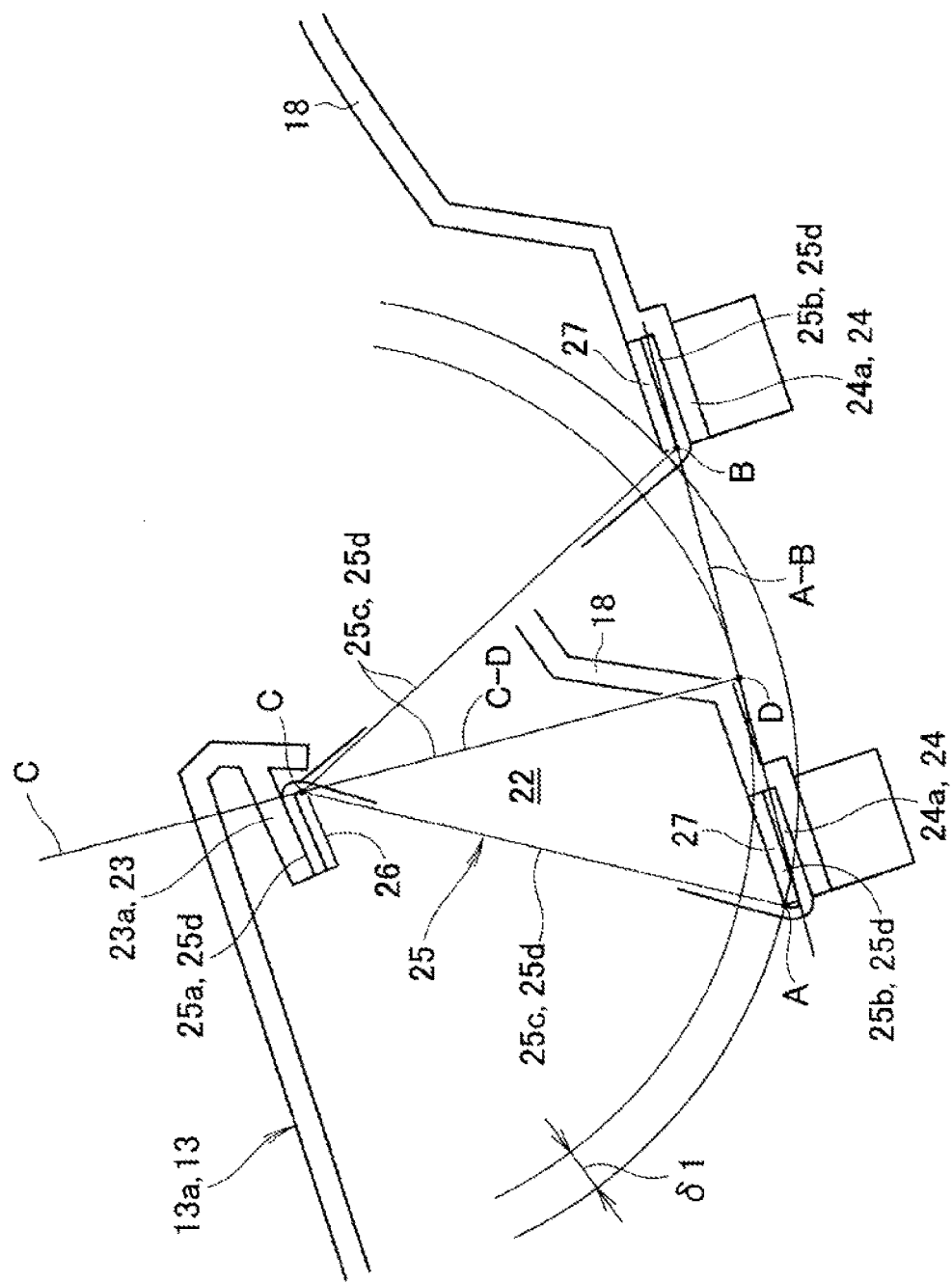
FIG. 6 illustrates a method of setting a blind length of an upper surface portion of a blind of FIG. 3.

Next, a method of setting a blind length L1 of the upper surface portion 25*d* of the blind 25 is described with reference to FIG. 6. As illustrated in FIG. 6, the one end 25*a* of the upper surface portion 25*d* of the blind 25 is fastened to the upper instrument-panel support portion 23*a* of the instrument-panel support 23 using the instrument-panel attachment plate 26. Also, the other end 25*b* of the upper surface portion 25*d* of the blind 25 is fastened to the upper cover support portion 24*a* of the cover support 24 using the cover attachment plate 27.

When the column cover 18 is disposed at its lowermost and foremost position using the tilt mechanism and the telescopic mechanism, a front end of the cover attachment plate 27 is defined as a foremost position A. When the column cover 18 is disposed at its lowermost and rearmost position using the tilt mechanism and the telescopic mechanism, the front end of the cover attachment plate 27 is defined as a rearmost position B.

A line C is defined as a line continuously passes through intermediate points equally separated from the foremost position A and the rearmost position B. A coupling position C is defined at such a position in the line C that the coupling position C is not on the upper side of the instrument-panel lower portion 13a and the coupling position C is not visible from an occupant of the vehicle 10. At the coupling position C, the one end 25a of the upper surface portion 25d of the blind 25 is coupled to the upper instrument-panel support portion 23a of the instrument-panel support 23. Furthermore, a line segment connecting the foremost position A and the rearmost position B is defined as a line segment A-B. An intersection D is defined as a point where a line segment C-D that extends from the coupling position C perpendicularly to the line segment A-B intersects the line segment A-B.

Here, it is preferable that the distance between the intersection D and the foremost position A be substantially the same as the distance between the intersection D and the rearmost position B. Although the coupling position C is described as a position where the distance between the intersection D and the foremost position A is substantially the same as the distance between the intersection D and the rearmost position B according to the embodiment, it is not limiting. That is, the coupling position C indicates a position between the foremost position A and the rearmost position B.

In this state, the length L1 of the line segment C-D is a minimum distance between the coupling position C to the front end of the cover attachment plate 27. The length of the intermediate portion 25c of the upper surface portion 25d of the blind 25 is set to the length L1 which is the distance between the coupling position C and the intersection D (that is, the length of the line segment C-D). Thus, the blind length L1 of the upper surface portion 25d of the blind 25 is set. Here, the blind length L1 is the distance between the upper instrument-panel support portion 23a and the upper cover support portion 24a.

Furthermore, a range of the extension rate (amount of extension/contraction) 81 of the upper surface portion 25d (specifically, the intermediate portion 25c) of the blind 25 is set to be appropriate with respect to the lengths of the line segments C-A and the C-B by, for example, conducting temperature/humidity testing. This can suppress creases caused by bends (referred to as "bending creases" hereafter) and creases caused by slackness (referred to as "slack creases" hereafter) in the intermediate portion 25c of the upper surface portion 25d when the cover support 24 disposed at its lowermost position is moved between the foremost position A and the rearmost position B.

Furthermore, the coupling position C is provided at the intermediate position between the foremost position A and the rearmost position B. Thus, when the cover attachment plate 27 is disposed at either the foremost position A or the rearmost position B, the extension/contraction ratio of the upper surface portion 25d of the blind 25 can be substantially equal. This can more preferably suppress the occurrences of the bending creases and the slack creases in the intermediate portion 25c of the upper surface portion 25d.

Furthermore, the one end 25a of the upper surface portion 25d of the blind 25 is fastened to the upper instrument-panel support portion 23a of the instrument-panel support 23 using the instrument-panel attachment plate 26. Also, the other end 25b of the upper surface portion 25d of the blind 25 is fastened to the upper cover support portion 24a of the cover support 24 using the cover attachment plate 27. This allows the gap 22 between the upper instrument-panel support portion 23a and the upper cover support portion 24a to be preferably covered so that the gap 22 is covered with the upper surface portion 25d of the blind 25.

Next, a method of setting a position where the one end 25a of the left side surface portion 25e of the blind 25 is fastened to the left instrument-panel support portion 23b (see FIG. 7) is described with reference to FIGS. 7 and 8. In order to set the position where the one end 25a of the left side surface portion 25e is fastened, it is required that extension and contraction of the left side surface portion 25e in the vehicle front-rear direction and the up-down direction be considered.

Figure 7:
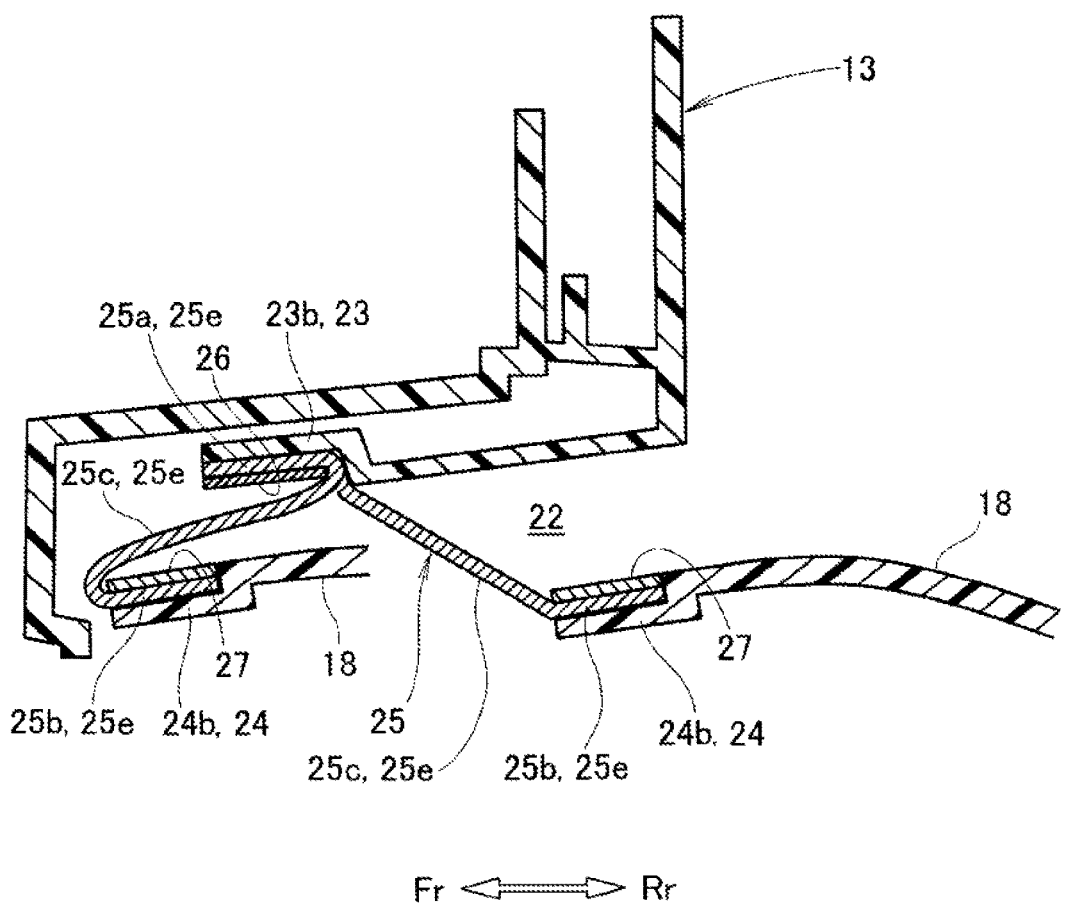
FIG. 7 is a sectional view illustrating a state in which another end of the blind of FIG. 5 is disposed at a foremost position and a rearmost position.

As illustrated in FIG. 7, the one end 25a of the left side surface portion 25e of the blind 25 is fastened to the left instrument-panel support portion 23b of the instrument-panel support 23 using the instrument-panel attachment plate 26. Also, the other end 25b of the left side surface portion 25e of the blind 25 is fastened to the left cover support portion 24b of the cover support 24 using the cover attachment plate 27.

In FIG. 7, the column cover 18 on the vehicle front side is disposed at the foremost position A (see FIG. 6), and the column cover 18 on the vehicle rear side is disposed at the rearmost position B (see FIG. 6).

Figure 8:
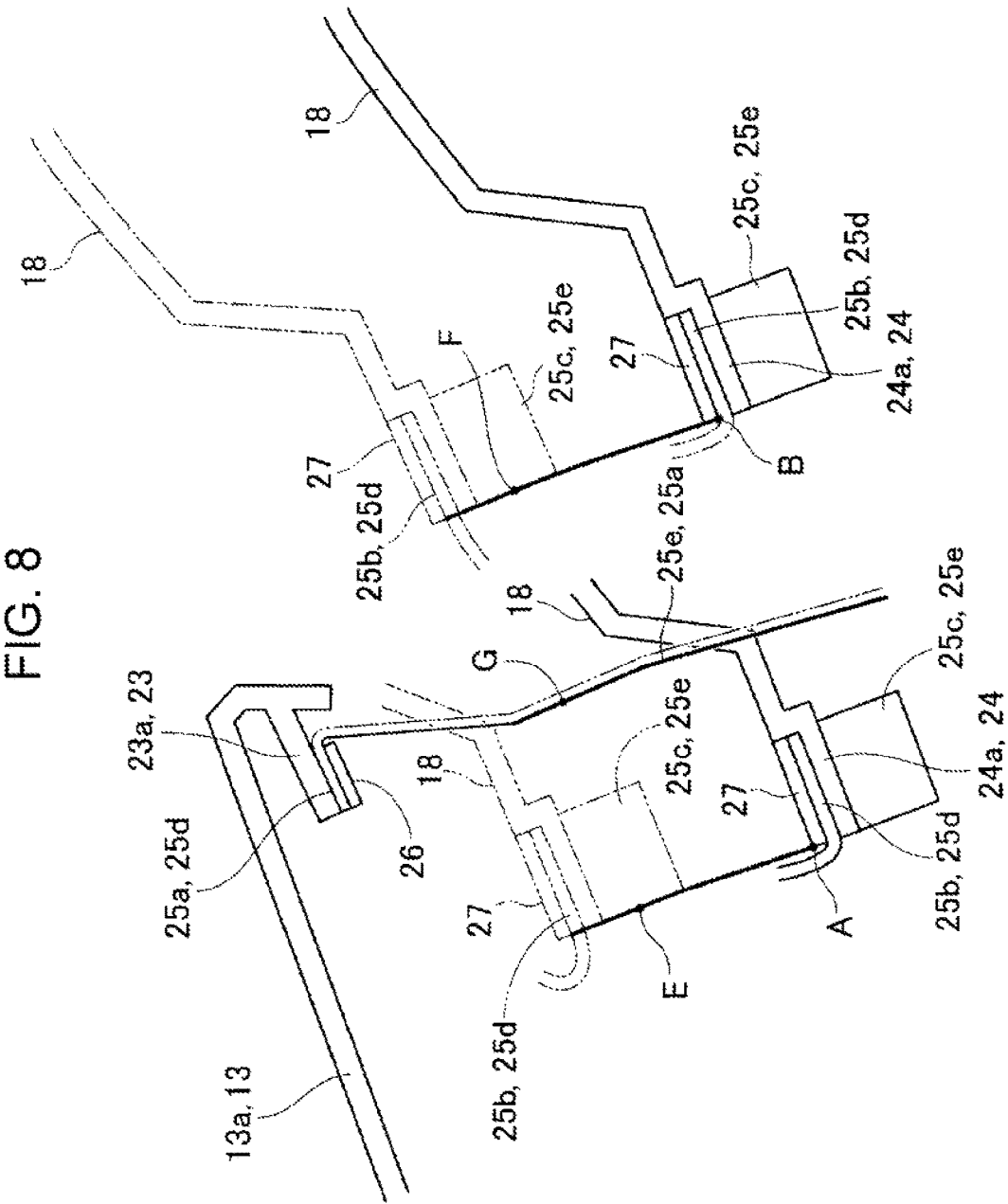
FIG. 8 illustrates a method of setting a fastening position of one end of a left side surface portion of the blind of FIG. 3.

As illustrated in FIG. 8, when the column cover 18 is tilted in an entire region in the up-down direction, the front end of the cover attachment plate 27 (that is, the foremost position A) is moved in the up-down direction. The locus in this up-down direction is defined as a front locus E. Also, when the rearmost position B is tilted in an entire region in the up-down direction, the front end of the cover attachment plate 27 (that is, the foremost position A) is moved in the up-down direction. The locus in this up-down direction is defined as a rear locus F.

Here, a locus extending in the up-down direction at intermediate positions between the front locus E and the rear locus F is defined as an intermediate locus G. The left instrument-panel support portion 23b (see FIG. 3) is formed along the intermediate locus G so as to be similar to the intermediate locus G. The one end 25a of the left side surface portion 25e of the blind 25 is fastened to the left instrument-panel support portion 23b. Accordingly, the one end 25a of the left side surface portion 25e is formed so as to be similar to the intermediate locus G extending in the up-down direction.

This allows a blind length (see FIG. 7) of the intermediate portion 25c of the left side surface portion 25e of the blind 25 to be reduced to a minimum necessary length. Accordingly, when the column cover 18 has been adjusted in the up-down direction and the vehicle front-rear direction, the occurrences of bending creases and slack creases in the left side surface portion 25e of the blind 25 can be suppressed.

Figure 9:
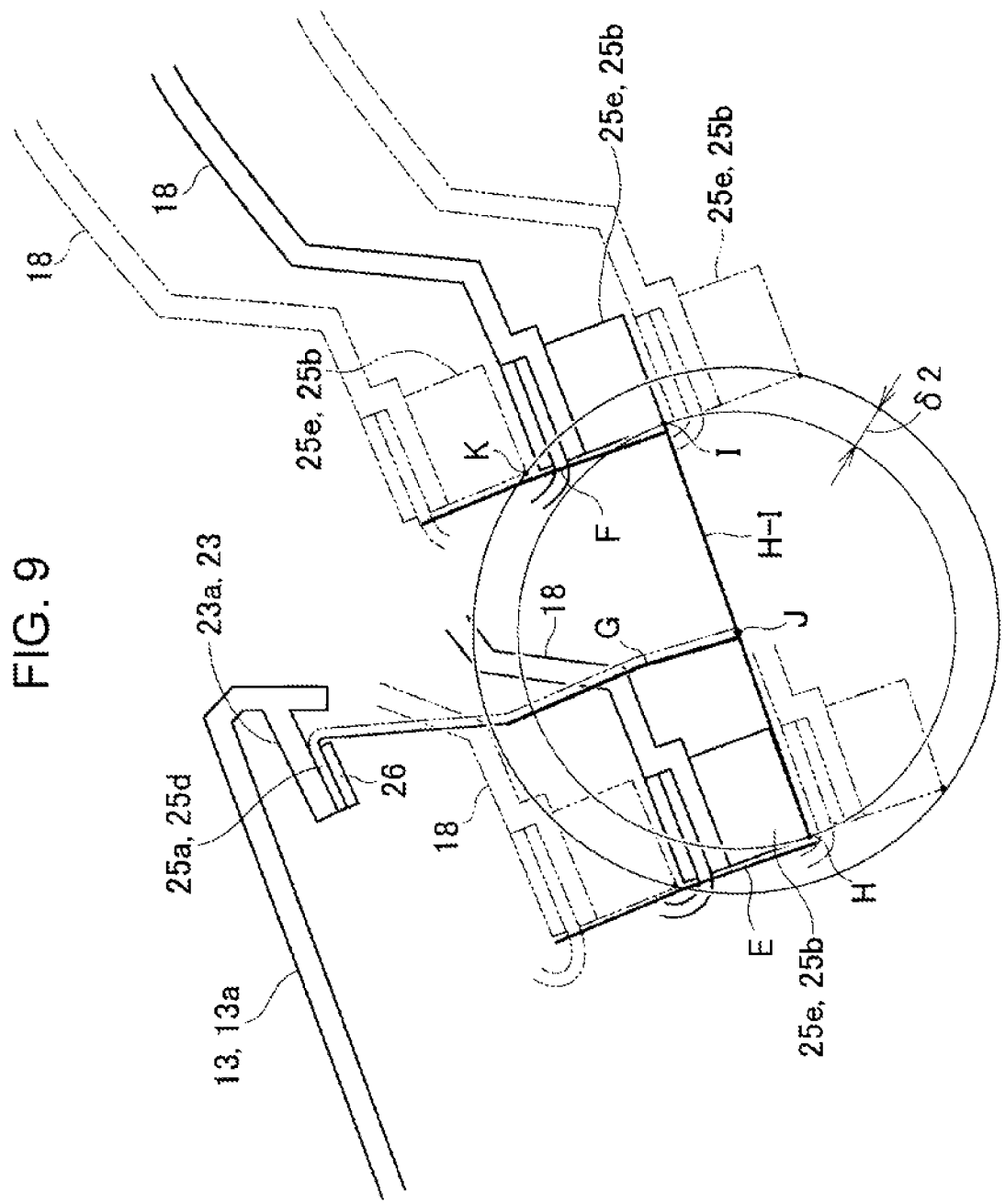
FIG. 9 illustrates a method of setting a lower end position of the one end of the left side surface portion of the blind of FIG. 3.

Next, a method of setting a lower end position of the left side surface portion 25e of the blind 25 when the left side surface portion 25e is fastened to the left instrument-panel support portion 23b (see FIG. 7) is described with reference to FIG. 9. As illustrated in FIG. 9, when the column cover 18 is disposed at a position which is an intermediate position in the up-down direction and a foremost position in the vehicle front-rear direction using the tilt mechanism and the telescopic mechanism, respectively, the position of a front lower end of the other end 25b of the left side surface portion 25e is defined as a front intermediate position H. Also, when the column cover 18 is disposed at a position which is the intermediate position in the up-down direction and a rearmost position in the vehicle front-rear direction, the rearmost position being reached by the column cover 18 using the telescopic mechanism, the position of a front lower end of the other end 25b of the left side surface portion 25e is defined as a rear intermediate position I.

Furthermore, an intermediate position of the line segment H-I connecting the front intermediate position H and the rear intermediate position I is defined as an intermediate position J. The intermediate position J is an intersection where the line segment H-I intersects the intermediate locus G. Accordingly, the level of a lower end 23d (see FIG. 3) of the left instrument-panel support portion 23b is the same as the level of the intermediate position J. That is, the lower end 23d of the left instrument-panel support portion 23b is set at the same level as the level of the lower end of the other end 25b of the left side surface portion 25e (that is, the line segment H-I) at the intermediate position in the up-down direction.

The other end 25b of the left side surface portion 25e is fastened to the left cover support portion 24b. Accordingly, the level of the lower end 23d of the left instrument-panel support portion 23b is the same as the level of a lower end 24d (see FIG. 3) of the left cover support portion 24b. Furthermore, the one end 25a of the left side surface portion 25e of the blind 25 is fastened to the left instrument-panel support portion 23b. Accordingly, the lower end of the one end 25a (that is, the intermediate position J) of the left side surface portion 25e is set at the same level as the level of the lower end of the other end 25b of the left side surface portion 25e (that is, the line segment H-I) at the intermediate position in the up-down direction.

Accordingly, the extension/contraction ratio of the "lower end of the other end 25b of the left side surface portion 25e" for adjustment in the up-down direction when the column cover 18 is disposed at the foremost position can be substantially equal to the extension/contraction ratio of the "lower end of the other end 25b of the left side surface portion 25e" for adjustment in the up-down direction when the column cover 18 is disposed at the rearmost position.

Here, when the column cover 18 is disposed at a position which is an upper position in the up-down direction and the rearmost position in the vehicle front-rear direction using the tilt mechanism and the telescopic mechanism, respectively, the position of the front lower end of the other end 25b of the left side surface portion 25e is defined as a rear upper position K. Furthermore, the distance between J and I is a length L3 and the distance between J and K is a length L4. The value of (length L4 of distance between J and K)/(length L3 of distance between J and I) is set so that an endurable extension/contraction allowable range of the blind 25 is not exceeded. That is, an extension rate (amount of extension/contraction) 82 of the left side surface portion 25e of the blind 25 is set so that the endurable extension/contraction allowable range of the blind 25 is not exceeded.

Furthermore, the extension/contraction ratio of the front lower end of the other end 25b of the left side surface portion 25e when the column cover 18 at the rearmost position is moved in the up-down direction using the tilt mechanism is substantially equal to the extension/contraction ratio of the front lower end of the other end 25b of the left side surface portion 25e when the column cover 18 at the foremost position position is moved in the up-down direction using the tilt mechanism. Accordingly, when the column cover 18 has been adjusted in the up-down direction and the vehicle front-rear direction, the occurrences of bending creases and slack creases in the left side surface portion 25e of the blind 25 can be suppressed.

Furthermore, from the viewpoint of ensuring quality, it is preferable that the lower end of the left side surface portion 25e be unlikely to be visible to the occupants in a driver's seat and a passenger seat and unlikely to be visible to the occupants when the occupants are getting on and off the vehicle. Accordingly, the lower end of the left side surface portion 25e is set as low as possible.

The one end 25a of the left side surface portion 25e of the blind 25 is fastened to the left instrument-panel support portion 23b of the instrument-panel support 23 using the instrument-panel attachment plate 26. Also, the other end 25b of the left side surface portion 25e of the blind 25 is fastened to the left cover support portion 24b of the cover support 24 using the cover attachment plate 27. This allows the gap 22 between the left instrument-panel support portion 23b and the left cover support portion 24b to be preferably covered so that the gap 22 is covered by the left side surface portion 25e of the blind 25.

Next, an example in which the state of the blind 25 is changed when the position of the column cover 18 disposed at the rearmost position in the vehicle front-rear direction is adjusted in the up-down direction using the tilt mechanism is described with reference to FIG. 10. It is assumed in FIGS. 10 to 12 that, when the blind 25 is fastened to the instrument-panel attachment plate 26 and the cover attachment plate 27, appropriate contraction performance is added to the blind 25 by extending the blind 25 in the left-right direction by an appropriate amount within such a range that the endurable extension allowable range of the blind is not exceeded.

Figure 10:
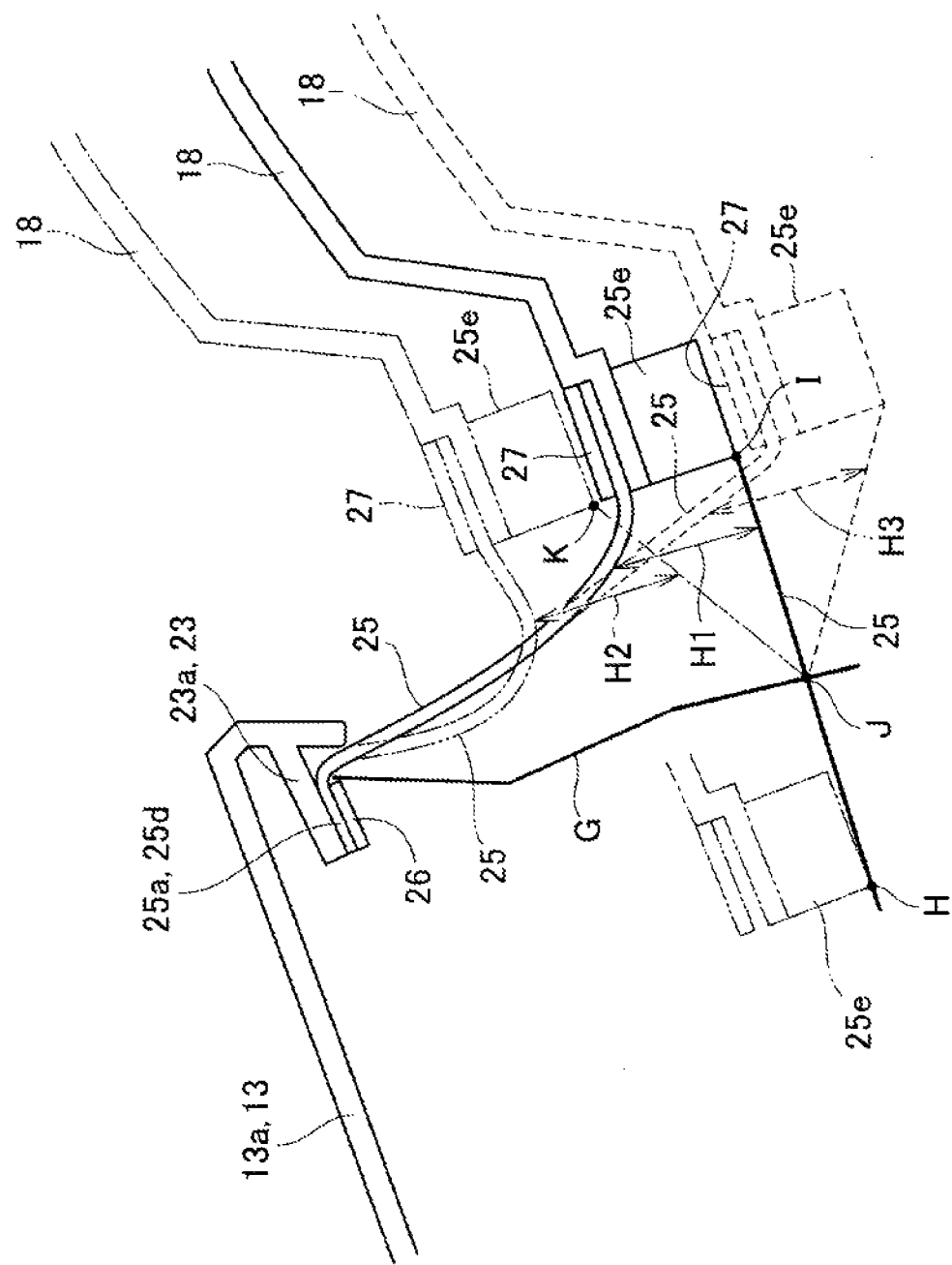
FIG. 10 illustrates an example in which a column cover of FIG. 4 disposed at a rearmost position is adjusted in an up-down direction.

Referring to FIG. 10, the blind 25 is indicated as follows: when the position of the column cover 18 is adjusted to a position which is the intermediate position in the up-down direction and the rearmost position, the blind 25 is indicated by solid lines; when the position of the column cover 18 is adjusted to a position which is the uppermost position in the up-down direction and the rearmost position, the blind 25 is indicated by phantom lines; and when the position of the column cover 18 is adjusted to a position which is the lowermost position in the up-down direction the rearmost position, the blind 25 is indicated by dashed lines.

As illustrated in FIG. 10, when the position of the column cover 18 is adjusted to the position which is the intermediate position in the up-down direction and the rearmost position, due to improvement of the above-described extension/contraction performance, the blind 25 is subjected to contraction in the left-right direction, and a force acts so as to pull down the blind 25. Thus, the occurrences of bends and slackness are suppressed. That is, neither bending creases nor slack creases occur in the blind 25. In this state, the height dimension of the left side surface portion 25e of the blind 25 is H1.

Furthermore, when the position of the column cover 18 is adjusted to the position which is the uppermost position in the up-down direction and the rearmost position, due to extension of a lower end line segment J-K of the left side surface portion 25e of the blind 25 in addition to improvement of the above-described extension/contraction performance, the blind 25 is subjected to contraction in the left-right direction, and a force acts so as to pull down the blind 25. Thus, the occurrences of bends and slackness are suppressed. Although slight slackness (that is, wave) occurs in the blind 25, neither bending creases nor slack creases occur in the blind 25. In this state, the height dimension of the left side surface portion 25e of the blind 25 is H2.

Furthermore, when the position of the column cover 18 is adjusted to the position which is the lowermost position in the up-down direction and the rearmost position, a tensile force within an allowable range acts on the blind 25. Thus, the blind 25 is stretched, and accordingly, neither bending nor slack occurs in the blind 25. In this state, the height dimension of the left side surface portion 25e of the blind 25 is H3.

Here, the contract action acts on the blind 25 so that the height dimension H1 of the left side surface portion 25e at the intermediate position in the up-down direction, the height dimension H2 of the left side surface portion 25*e* at the uppermost position in the up-down direction, and the height dimension H3 of the left side surface portion 25*e* at the lowermost position in the up-down direction are substantially equal to one another.

Accordingly, when the position of the column cover 18 is adjusted in the up-down direction at the rearmost position, the occurrences of bending creases and slack creases in the blind 25 can be suppressed.

Figure 11:
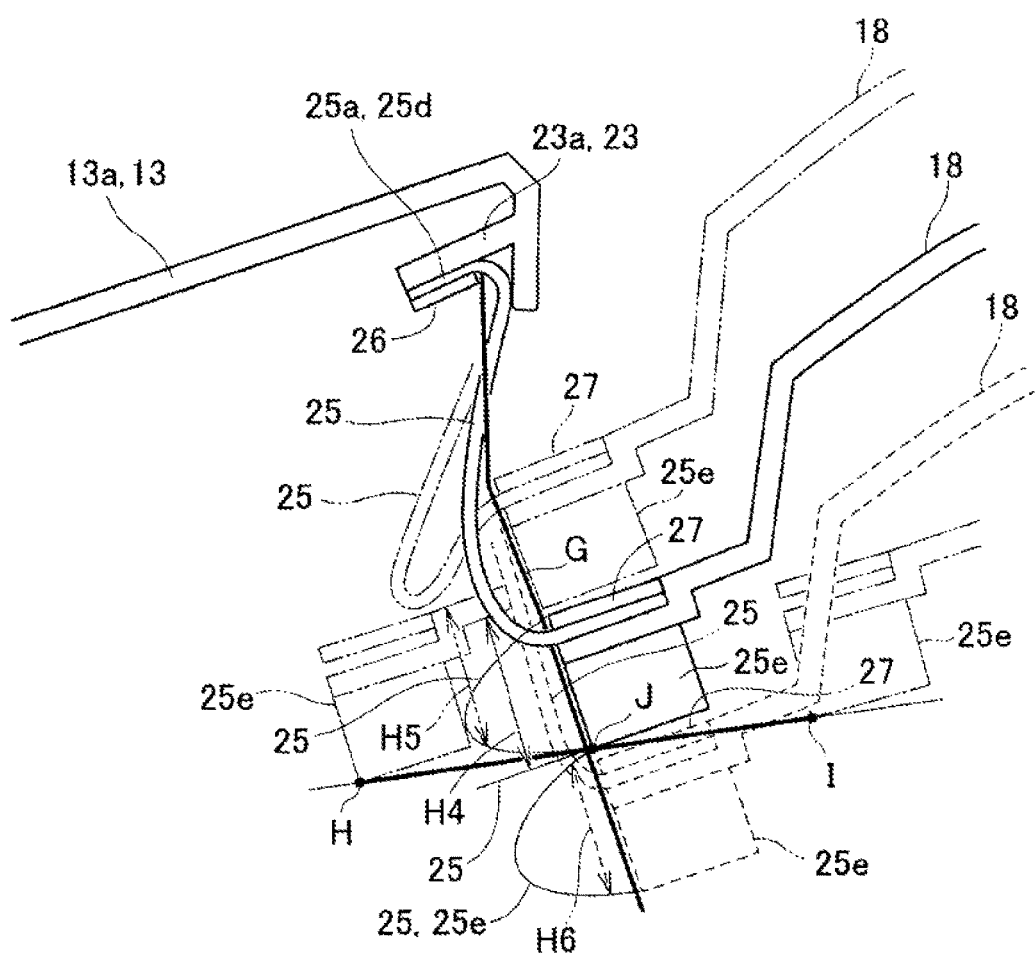
FIG. 11 illustrates an example in which the column cover of FIG. 4 disposed at an intermediate position is adjusted in the up-down direction.

Next, an example in which the state of the blind 25 is changed when the position of the column cover 18 disposed at the intermediate position in the vehicle front-rear direction is adjusted in the up-down direction using the tilt mechanism is described with reference to FIG. 11. Referring to FIG. 11, the blind 25 is indicated as follows: when the position of the column cover 18 is adjusted to a position which is the intermediate position in the up-down direction and the intermediate position in the vehicle front-rear direction, the blind 25 is indicated by solid lines; when the position of the column cover 18 is adjusted to a position which is the uppermost position in the up-down direction and the intermediate position in the vehicle front-rear direction, the blind 25 is indicated by phantom lines; and when the position of the column cover 18 is adjusted to a position which is the lowermost position in the up-down direction and the intermediate position in the vehicle front-rear direction, the blind 25 is indicated by dashed lines.

As illustrated in FIG. 11, when the position of the column cover 18 is adjusted to the position which is the intermediate position in the up-down direction and the intermediate position in the vehicle front-rear direction, due to improvement of the above-described extension/contraction performance, the blind 25 is subjected to contraction in the left-right direction, and a force acts so as to pull down the blind 25. Thus, the occurrences of bends and slackness are suppressed. Although slight slackness (that is, wave) occurs in the blind 25, neither bending creases nor slack creases occur in the blind 25. In this state, the height dimension of the left side surface portion 25*e* of the blind 25 is H4.

Furthermore, when the position of the column cover 18 is adjusted to the position which is the uppermost position in the up-down direction and the intermediate position in the vehicle front-rear direction, due to improvement of the above-described extension/contraction performance, the blind 25 is subjected to contraction in the left-right direction, and a force acts so as to pull down the blind 25. Thus, the occurrences of bends and slackness are suppressed. Although slight slackness (that is, wave) occurs in the blind 25, no bend occurs in the blind 25. That is, neither bending creases nor slack creases occur in the blind 25. In this state, the height dimension of the left side surface portion 25*e* of the blind 25 is H5.

Furthermore, when the position of the column cover 18 is adjusted to the position which is the lowermost position in the up-down direction and the intermediate position in the vehicle front-rear direction, a tensile force within an allowable range acts on the blind 25. Thus, the blind 25 is stretched, and accordingly, neither bending nor slack occurs in the blind 25. That is, neither bending creases nor slack creases occur in the blind 25. In this state, the height dimension of the left side surface portion 25*e* of the blind 25 is H6.

Here, the contract action acts on the blind 25 so that the height dimension H4 of the left side surface portion 25*e* at the intermediate position in the up-down direction, the height dimension H5 of the left side surface portion 25*e* at the uppermost position in the up-down direction, and the height dimension H6 of the left side surface portion 25*e* at the lowermost position in the up-down direction are substantially equal to one another. Accordingly, when the position of the column cover 18 is adjusted in the up-down direction at the intermediate position in the vehicle front-rear direction, the occurrences of bending creases and slack creases in the blind 25 can be suppressed.

Figure 12:
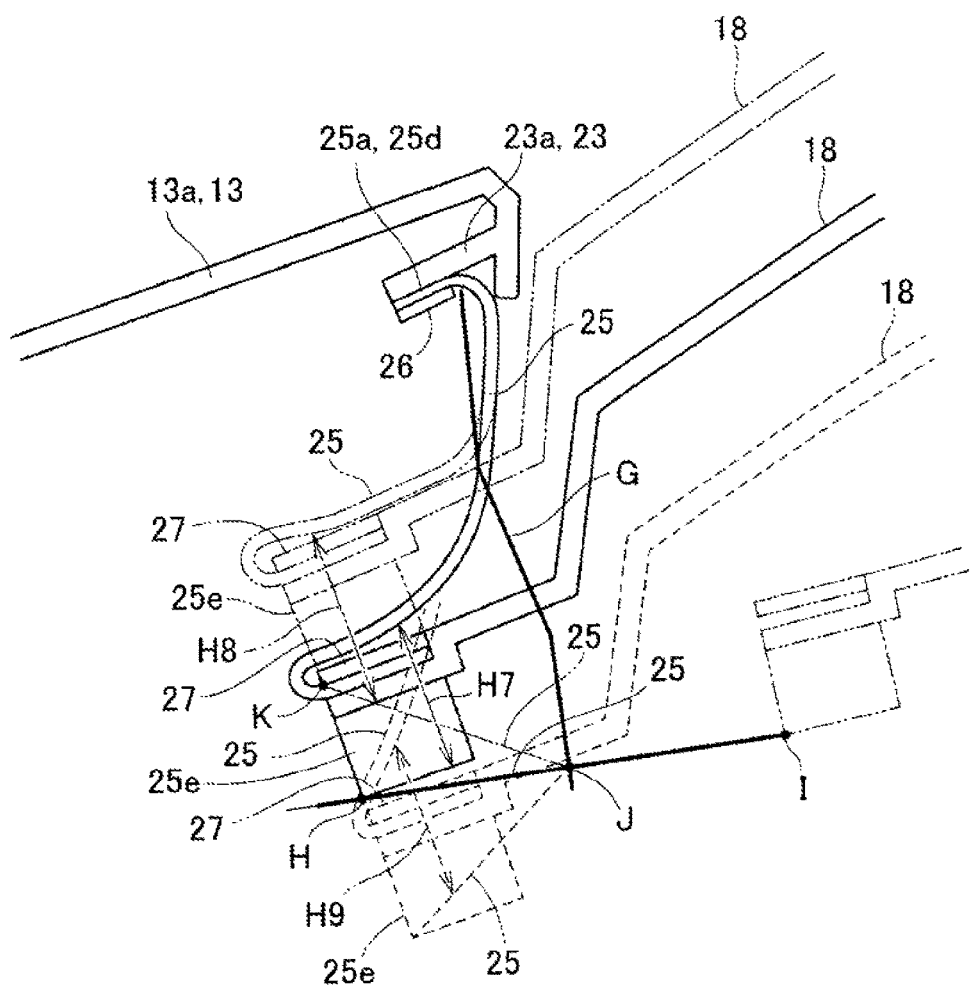
FIG. 12 illustrates an example in which the column cover of FIG. 4 disposed at a foremost position is adjusted in the up-down direction.

Next, an example in which the state of the blind 25 is changed when the column cover 18 disposed at the foremost position in the vehicle front-rear direction is adjusted in the up-down direction using the tilt mechanism is described with reference to FIG. 12. Referring to FIG. 12, the blind 25 is indicated as follows: when the position of the column cover 18 is adjusted to a position which is the intermediate position in the up-down direction and the foremost position in the vehicle front-rear direction, the blind 25 is indicated by solid lines; when the position of the column cover 18 is adjusted to a position which is the uppermost position in the up-down direction and the foremost position in the vehicle front-rear direction, the blind 25 is indicated by phantom lines; and when the position of the column cover 18 is adjusted to a position which is the lowermost position in the up-down direction and the foremost position in the vehicle front-rear direction, the blind 25 is indicated by dashed lines.

As illustrated in FIG. 12, when the position of the column cover 18 is adjusted to the position which is the intermediate position in the up-down direction and the foremost position in the vehicle front-rear direction, due to improvement of the above-described extension/contraction performance, the blind 25 is subjected to contraction in the left-right direction, and a force acts so as to pull down the blind 25. Although slackness (that is, wave) occurs in the blind 25, no bend occurs in the blind 25. That is, neither bending creases nor slack creases occur in the blind 25. In this state, the height dimension of the left side surface portion 25*e* of the blind 25 is H7.

Furthermore, when the position of the column cover 18 is adjusted to the position which is the uppermost position in the up-down direction and the foremost position in the vehicle front-rear direction, due to extension of the lower end line segment J-K of the left side surface portion 25*e* of the blind in addition to improvement of the above-described extension/contraction performance, the blind 25 is subjected to contraction in the left-right direction, and a force acts so as to pull down the blind 25. Although slackness (that is, wave) occurs in the blind 25, no bend occurs in the blind 25. That is, neither bending creases nor slack creases occur in the blind 25. In this state, the height dimension of the left side surface portion 25*e* of the blind 25 is H8.

Furthermore, when the position of the column cover 18 is adjusted to the position which is the lowermost position in the up-down direction and the foremost position in the vehicle front-rear direction, a tensile force within an allowable range acts on the blind 25. Thus, the blind 25 is stretched, and accordingly, neither bending nor slack occurs in the blind 25. That is, neither bending creases nor slack creases occur in the blind 25. In this state, the height dimension of the left side surface portion 25*e* of the blind 25 is H9.

Here, the contract action acts on the blind 25 so that the height dimension H7 of the left side surface portion 25*e* at the intermediate position in the up-down direction, the height dimension H8 of the left side surface portion 25*e* at the uppermost position in the up-down direction, and the height dimension H9 of the left side surface portion 25*e* at the lowermost position in the up-down direction are substantially equal to one another.

Accordingly, when the position of the column cover 18 is adjusted in the up-down direction at the foremost position in the vehicle front-rear direction, the occurrences of bending creases and slack creases in the blind 25 can be suppressed.

Thus, the occurrences of bending creases and slack creases in the blind 25 can be suppressed when the position of the column cover 18 is adjusted throughout the up-down direction and the vehicle front-rear direction. Here, the tensile force acting on the blind 25, slight slackness (that is, wave) occurring in the blind 25, and the like can be distributed throughout the blind 25. This can more preferably suppress the occurrences of the bending creases and the slack creases in the blind 25.

It should be understood that the column blind device 20 according to the present application is not limited to the above-described embodiment and can be appropriately, for example, changed or improved. For example, the shapes and structures of the vehicle, the instrument panel, the instrument-panel lower portion, the steering column, the column cover, the column blind device, the instrument-panel support, the cover support, the blind, and the like described in the above-described embodiment are not limited to the exemplified shapes and structures and can be appropriately changed.

The present application is preferably applied to automobiles that include a column blind device covering a gap between an instrument panel and a column cover.

What is claimed is:

1. A column blind device provided in a vehicle, comprising:
   an instrument panel;
   a steering column a position of which is adjustable relative to the instrument panel in a vehicle front-rear direction and an up-down direction such that the steering column is configured to move between its foremost position and its rearmost position in the vehicle front-rear direction;
   a column cover that covers the steering column; and
   a flexible blind disposed in a gap between the instrument panel and the column cover, one end of the flexible blind being fixed to an instrument-panel-side support provided to the instrument panel, another end of the flexible blind being fixed to a column-cover-side support provided to the column cover, such that the flexible blind extends between the instrument panel and the column cover, thereby closing the gap, the column-cover-side support moving between its foremost position and its rearmost position as the steering column moves between its foremost position and its rearmost position in the vehicle front-rear direction, wherein the instrument-panel-side support is positioned in an intermediate position in the vehicle front-rear direction, which is between the foremost position and the rearmost position of the column-cover-side support,
   wherein the instrument-panel-side support has a side portion disposed along a side portion of the column cover, and
   wherein a lower end of the side portion of the instrument-panel-side support has a height identical to a height of a lower end of a side portion of the column-cover-side support when the column-cover-side support is in an intermediate position in the up-down direction.

2. The column blind device according to claim 1, wherein the steering column is further configured to move between its uppermost position and its lowermost position in the up-down direction, in accordance with which the column-cover-side support moves between its uppermost position and its lowermost position,
   wherein the blind has an upper surface portion disposed on an upper side of the column cover, and
   wherein the upper surface portion of the blind has a length in a direction extending between the instrument-panel-side support and the column-cover-side support, the length of the upper surface portion is set to a distance between the instrument-panel-side support and the column-cover-side support when the column-cover-side support is in the intermediate position in the vehicle front-rear direction and is in the lowermost position in the up-down direction.

3. The column blind device according to claim 1, wherein the side portion of the instrument-panel-side support is formed so as to be similar to a locus of the column-cover-side support in the up-down direction.

4. The column blind device according to claim 1, wherein the another end of the blind fastened to the column-cover-side support has a length extending from a front side to a rear side of the column-cover-side support such that the blind further extends from the rear side to the instrument-panel-side support.

5. The column blind device according to claim 1, wherein the instrument-panel-side support is positioned in the intermediate position which is equally away from the foremost position and the rearmost position of the column-cover-side support in the vehicle front-rear direction.

6. The column blind device according to claim 1, further comprising:
   a cover attachment plate configured to fix the another end of the flexible blind to the column-cover-side support such that the another end of the flexible blind is held between the cover attachment plate and the column-cover-side support, an outer surface of the cover attachment plate extending to and being aligned with an outer surface of the column cover.

* * * * *